United States Patent
Chang et al.

(10) Patent No.: US 7,450,926 B2
(45) Date of Patent: Nov. 11, 2008

(54) APPARATUS AND METHOD FOR CONTROLLING SLEEP MODE IN WIRELESS ACCESS COMMUNICATION SYSTEM

(75) Inventors: Sun-Ny Chang, Suwon-si (KR); Jeong-Hoon Park, Yongin-si (KR); Yun-Sang Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 493 days.

(21) Appl. No.: 10/879,786

(22) Filed: Jun. 29, 2004

(65) Prior Publication Data

US 2005/0049012 A1 Mar. 3, 2005

(30) Foreign Application Priority Data

Sep. 1, 2003 (KR) .................. 10-2003-0060931

(51) Int. Cl.
*H04B 1/16* (2006.01)
(52) U.S. Cl. ............... 455/343.4; 455/574; 370/311; 370/335; 340/7.33; 340/7.36
(58) Field of Classification Search ........... 455/458, 455/574, 343, 38.3, 31.3, 343.1, 343.2, 343.4, 455/572; 370/311, 312, 313, 314, 332, 335, 370/441; 340/825, 44, 7.32, 7.33, 7.26
See application file for complete search history.

(56) References Cited

U.S. PATENT DOCUMENTS

| | | | | |
|---|---|---|---|---|
| 5,822,689 A * | 10/1998 | Hwang | ............... | 340/7.34 |
| 5,924,017 A * | 7/1999 | Pinter et al. | ............... | 340/7.36 |
| 6,438,375 B1 | 8/2002 | Muller | | |
| 6,463,307 B1 * | 10/2002 | Larsson et al. | ............... | 455/574 |
| 6,829,493 B1 * | 12/2004 | Hunzinger | ............... | 455/574 |
| 6,937,578 B1 * | 8/2005 | Hunzinger | ............... | 370/311 |
| 6,968,219 B2 * | 11/2005 | Pattabiraman et al. | ............... | 455/574 |
| 6,980,823 B2 * | 12/2005 | Challa et al. | ............... | 455/522 |
| 7,142,896 B2 * | 11/2006 | Lee | ............... | 455/574 |
| 2003/0036354 A1 * | 2/2003 | Lee et al. | ............... | 455/41 |
| 2004/0236829 A1 * | 11/2004 | Xu et al. | ............... | 709/204 |

FOREIGN PATENT DOCUMENTS

WO WO 96/19084 6/1996

OTHER PUBLICATIONS

Kitroser et al., "IEEE 802.16e Sleep Mode", Mar. 11, 2003.

* cited by examiner

*Primary Examiner*—Sonny Trinh
*Assistant Examiner*—Nhan T Le
(74) *Attorney, Agent, or Firm*—The Farrell Law Firm, PC

(57) ABSTRACT

An apparatus and method for controlling a sleep mode in a wireless access communication system. The apparatus determines a predetermined number of groups for grouping at least one subscriber terminal according to type information of a paging interval equal to the sum of the sleep interval and the listening interval, and registers the subscriber terminal in one group from among the groups on the basis of the paging interval type of the subscriber terminal. Upon receipt of the group information, the apparatus controls a base station to pre-recognize a terminal woken up at a predetermined time from among a plurality of terminals entering the sleep mode, resulting in reduction of the number of unnecessary paging message transmissions and improved efficiency of the wireless access communication system.

16 Claims, 14 Drawing Sheets

APPARATUS AND METHOD FOR CONTROLLING SLEEP MODE IN WIRELESS ACCESS COMMUNICATION SYSTEM

PRIORITY

This application claims priority to an application entitled "APPARATUS AND METHOD FOR CONTROLLING BROADBAND WIRELESS ACCESS COMMUNICATION SYSTEM", filed in the Korean Intellectual Property Office on Sep. 1, 2003 and assigned Ser. No. 2003-60931, the contents of which are hereby incorporated by reference.

BACKGROUND OF THE INVENTION

1. Field of the Invention

The present invention relates to a wireless access communication system, and more particularly to an apparatus and method for controlling a sleep mode in a wireless access communication system.

2. Description of the Related Art

Typically, conventional cellular networks (e.g., a CDMA (Code Division Multiplex Access network), a GSM (Global System for Mobile communication) network, etc.) have widely utilized a slotted paging scheme to implement a sleep mode. In more detail, if it is determined that a current mode is not an active mode, individual terminals operating in such a conventional cellular network remain in a sleep mode which they consume less power, and occasionally awaken from the sleep mode to check reception of their paging signals. If the paging signal is transmitted to any one of the terminals, a corresponding terminal changes its own mode to an active mode. Otherwise, if no paging signal is transmitted to the terminals, the terminals re-enter the sleep mode.

In this case, a unique paging slot between a base station and one terminal is predetermined, such that each terminal awakens from its sleep mode to check its own paging message reception on its unique paging slot. For example, paging slots of individual terminals of a CDMA system are predetermined and paging groups are predetermined in a GSM system, such that CDMA and GSM terminals must awaken from the sleep mode at intervals of a predetermined time. This predetermined time is a fixed time preset by the CDMA or GSM system, such that it is very convenient for the fixed time to be implemented or managed in the CDMA or GSM system.

However, it is difficult to control a sleep mode using a wireless access communication system (also called a 4G (4th Generation) communication system) currently being researched and developed to support a high-speed communication service. In more detail, in the case of a sleep mode proposed by an IEEE 802.16e communication system which takes into consideration mobility of mobile terminals in an IEEE 802.16a communication system, its sleep interval increases according to an exponent power of 2 of an initial sleep interval, i.e., by a multiple of 2 of a previous sleep interval, such that it is difficult to control the sleep mode in the wireless access communication system. In other words, the IEEE 802.16e communication system controls its sleep interval by increasing the interval according to the exponent power of 2 of the initial sleep interval, such that it is difficult for the IEEE 802.16e communication system to manage individual sleep mode start times, individual sleep intervals, and individual awake times of a plurality of subscriber terminals, resulting in difficulty in controlling the sleep mode using the IEEE 802.16e communication system.

FIG. 1 is a flow chart illustrating a sleep mode control method for use in the IEEE 802.16e communication system. Typically, the sleep mode of the IEEE 802.16e communication system begins its operation upon receipt of either a request of a subscriber terminal or a control signal of a base station. A method for beginning the sleep mode control operation using the subscriber terminal's request will hereinafter be described with reference to FIG. 1.

Referring to FIG. 1, a subscriber terminal 10 requesting entry into the sleep mode transmits a sleep request message (i.e., an SLP-REQ message) to a base station 20 at step S31. In this case, the subscriber terminal transmits a minimum size value (e.g., a min-window value) and a maximum size value (e.g., a max-window value) of a desired sleep interval, and a listening interval value serving as a time interval during which a corresponding terminal awakens from the sleep mode to check its own paging message reception. The minimum size value, the maximum size value, and the listening interval value each have a frame unit.

The base station 20 receiving the SLP-REQ message performs a sleep time scheduling operation with reference to predetermined sleep control data (e.g., an allowable min-window value, an allowable max-window value, and an allowable listening interval value, etc.) at step S32, and transmits a sleep response (SLP-RSP) message to the subscriber terminal 10 at step S33. In this case, until the subscriber terminal 10 enters the sleep mode, the base station 20 transmits a variety of messages to the subscriber terminal 10, for example, a specific message (i.e., a start-time value) indicative of the number of remaining frames, a min-window value, a max-window value, and a listening interval value approved by the base station 20. The specific message, the min-window value, the max-window value, and the listening interval value each have a frame unit.

The subscriber terminal 10 receiving the SLP-RSP message enters the sleep mode at a start time contained in the SLP-RSP message at step S34. The subscriber terminal 10 awakens from the sleep mode after the lapse of a sleep interval, and determines whether there is packet data unit (PDU) data to be transferred from the base station 20 to the subscriber terminal 10. In more detail, after the lapse of the sleep interval, the subscriber terminal 10 enters an awake mode at step S35, and checks a TRF-IND message (i.e., a TRaFfic-INDication message called a paging message) broadcast by the base station 20 during the listening interval at step S36. The TRF-IND message is specific information broadcast from the base station 20 to the subscriber terminal 10, and includes basic CIDs (connection IDs) of terminals that the PDU data has to be transmitted to.

The subscriber terminal 10 determines whether its own basic CID (BCID) is contained in the TRF-IND message in such a way that it determines its awake mode. In more detail, if a TRF-IND message received in the subscriber terminal 10 contains a BCID of the subscriber terminal 10, the subscriber terminal 10 recognizes the presence of PDU data to be transmitted to the subscriber terminal 10, such that it awakens from the sleep mode. If the TRF-IND message received in the subscriber terminal 10 is a positive traffic indication message at step S37, the subscriber terminal 10's current status is transitioned to the active mode S38.

If it is determined that a TRF-IND message received in the subscriber terminal 10 does not contain a BCID of the subscriber terminal 10, the subscriber terminal 10 determines that there is no PDU data to be transferred to the subscriber terminal 10, and re-enters the sleep mode. In more detail, if the TRF-IND message received in the subscriber terminal 10 is a negative traffic indication message, the subscriber terminal 10 changes its current mode back to the sleep mode at step S34, and waits for the subscriber terminal 10 to awaken from the sleep mode during the sleep interval.

In this case, the subscriber terminal 10 increases the sleep interval by two times a previous sleep interval at step S39, and maintains the sleep mode during the increased sleep interval at step S34. The subscriber terminal 10 may repeats the sleep mode and the awake mode until entering the active mode. The subscriber terminal 10 increases the sleep interval by two times the previous sleep interval at each repetition time of the sleep and awake modes, and continues to increase the sleep interval until the base station 20 reaches an allowable max-window value of the subscriber terminal 10. As stated above, the IEEE 802.16e communication system increases a sleep interval by two times of a previous sleep interval using a sleep update algorithm, and at the same time begins the sleep mode. Therefore, the IEEE 802.16e communication system increases the sleep interval according to the exponent power of 2 of the initial sleep interval, such that it is difficult for the base station to manage individual sleep intervals of a plurality of subscriber terminals at one time.

In the meantime, three messages are prescribed between the subscriber terminal and the base station to allow the subscriber terminal to enter the sleep mode in the IEEE 802.16e communication system. In more detail, the above three messages are an SLP-REQ message (SleeP REQuest message), an SLP-RSP message (SleeP ReSPonse message), and a TRF-IND message (TraFfic INDication message).

FIGS. 2a to 2d depict exemplary message formats communicating between the base station and the subscriber terminal to control the sleep mode. FIG. 2a is an exemplary format of a sleep request message format 40, and FIG. 2b is an exemplary format of a sleep response message 50a at a sleep denial time. FIG. 2c is an exemplary format of a sleep response message 50b at a sleep approval time, and FIG. 2d is an exemplary format of a TRF-IND message 60.

Referring to FIG. 2a, the SLP-REQ message 40 includes a management message type 41 composed of 8 bits, a min-window value 42 composed of 6 bits, a max-window value 43 composed of 10 bits, and a listening interval value 44 composed of 8 bits. The SLP-REQ message 40 is a dedicated message transferred on the basis of a connection ID (CID) of a subscriber terminal, and is a predetermined message requested when the subscriber terminal desires to enter the sleep mode.

In this case, the management message type field 41 is adapted to indicate the category of a current transmission message. If the management message type is a predetermined value of "45", this means that a corresponding message is equal to the SLP-REQ message. The management message type 41 is implemented with 8 bits.

The min-window value 42 indicates a requested start value for the sleep interval measured in frame units. The max-window value 43 indicates a requested stop value for the sleep interval measured in frame units. In more detail, the sleep interval is increased by two times the min-window value 42 in the range from the min-window value 42 to the max-window value 43 in such a way that it is updated with a new sleep interval. The listening interval 44 indicates a requested listening interval measured in frame units.

In this case, the min-window value 42, the max-window value 43, and the listening interval 44 are set up in frame units.

Referring to FIG. 2b, the SLP-RSP message 50a refusing the sleep request includes a management message type 51a composed of 8 bits, a sleep-approved field 52a composed of 1 bit, and a reserved field 53a composed of 7 bits. The SLP-RSP message 50a is a dedicated message transferred on the basis of a CID of a subscriber terminal, and is adapted to determine a sleep timing point of the subscriber terminal after the base station finishes scheduling the sleep time of the subscriber terminal.

In this case, the management message type field 51a is adapted to indicate the category of a current transmission message. If the management message type field 51a is set to a predetermined value of "46", this means that a corresponding message is the SLP-RSP message.

The sleep-approved field 52a is represented in the form of 1 bit. If the sleep-approved field 52a is set to "0", this means a sleep-mode request denied status. The reserved field 53a is a spare field.

Referring to FIG. 2c, if the base station approves the sleep mode request, the SLP-RSP message 50b includes a management message type field 51b composed of 8 bits, a sleep-approved field 52b composed of 1 bit, a start-time field 53b composed of 7 bits, a min-window field 54b of 6 bits, a max-window field 55b of 10 bits, and a listening interval field 56b of 8 bits.

In this case, the management message type field 51b is adapted to indicate the category of a current transmission message. If the management message type field 51b is set to a predetermined value of "46", this means that a corresponding message is the SLP-RSP message.

The sleep-approved field 52b is represented in the form of 1 bit. If the sleep-approved field 52b is set to "1", this means a sleep-mode request approved status.

The start-time field 53b indicates values of frames provided until the subscriber terminal enters the first sleep interval, and does not include a frame receiving the SLP-RSP message. In more detail, the subscriber terminal is transitioned to the sleep mode after the lapse of a predetermined time during which it passes through a plurality of frames ranging from the following frame next to the frame receiving the SLP-RSP message to frames contained in the start-time field.

The min-window field 54b indicates a start value for the sleep interval measured in frame units, the max-window field 55b indicates a stop value for the sleep interval measured in frame units, and the listening interval field 56b indicates a prescribed value for the listening interval measured in frame units.

Referring to FIG. 2d, the TRF-IND message 60 includes a management message type field 61 composed of 8 bits, a NUM-POSITIVE field 62 composed of 8 bits to indicate the number of positive subscribers, and individual CIDs 63 and 64, each composed of 16 bits, of individual positive subscribers. The TRF-IND message 60 is transmitted according to a broadcasting scheme, differently from the SLP-REQ message and the SLP-RSP message.

The management message type field 61 is adapted to indicate the category of a current transmission message. If the management message type field 61 is set to "47", this means that a corresponding message is the TRF-IND message.

The NUM-POSITIVE field 62 indicates the number of subscriber terminals to which packet data is to be transmitted. The CIDs 63 and 64 of individual positive subscribers include CID information of a specific number indicative of the number of positive subscribers.

FIG. 3 is an exemplary configuration illustrating a sleep interval update algorithm proposed by the IEEE 802.16e communication system. In FIG. 3, 'SS' is an abbreviation of a subscriber terminal, 'BS' is an abbreviation of a base station, and an exemplary box composed of 'SS' and 'BS' indicates a frame.

Referring to FIG. 3, the subscriber terminal SS requests the sleep mode from the base station BS at the n-th frame at step S71. Provided that the base station BS sets a sleep mode start-time point to the (n+3)-th frame, and replies to the sleep mode request at step S72, the subscriber terminal SS repeats the sleep interval and the listening interval. Referring to FIG. 3, the first sleep interval is composed of two frames, but the second sleep interval is composed of four frames (double the two frames) contained in the first sleep interval.

As stated above, the conventional IEEE 802.16e communication system commands individual subscriber terminals to enter the sleep mode at different time points, and individual sleep intervals of the subscriber terminals increase according to the exponent power of 2 of the initial sleep interval. Therefore, the IEEE 802.16e communication system has difficulty in controlling individual sleep interval of individual subscriber terminals in the base station, and also has difficulty in grouping and managing the subscriber terminals.

In addition, the base station and the subscriber terminal transmit or receive min-window and max-window information for the sleep interval setup, resulting in an increased amount of transmission data.

SUMMARY OF THE INVENTION

Therefore, the present invention has been made in view of the above problems, and it is an object of the present invention to provide an apparatus and method for controlling a sleep mode in a wireless access communication system, which controls a base station to easily manage individual sleep intervals of subscriber terminals in the wireless access communication system.

It is another object of the present invention to provide an apparatus and method for controlling a sleep mode, which controls a base station for use in a wireless access communication system to group and manage subscriber terminals to reduce an amount of traffic needed to transmit a paging message.

It is yet another object of the present invention to provide an apparatus and method for controlling a sleep mode in a wireless access communication system, which reduces an amount of data needed to indicate a min-window size and a max-window size each serving as sleep interval update information.

In accordance with one aspect of the present invention, the above and other objects can be accomplished by the provision of a method for controlling a sleep mode containing a sleep interval and a listening interval in a wireless access communication system containing a base station and subscriber terminals, comprising the steps of determining a predetermined number of groups for grouping the subscriber terminals according to type information of a paging interval equal to the sum of the sleep interval and the listening interval; and upon receiving a sleep request from any one of the subscriber terminals, determining a paging interval type of the subscriber terminal on the basis of the sleep request and paging interval types of the groups, and registering the subscriber terminal in one group from among the groups.

In accordance with another aspect of the present invention, there is provided an apparatus for controlling a sleep mode containing a sleep interval and a listening interval in a wireless access communication system, comprising a grouping unit for determining a predetermined number of groups for grouping subscriber terminals according to type information of a paging interval equal to the sum of the sleep interval and the listening interval; a transmission/reception unit for receiving a sleep request message (i.e., an SLP-REQ message) for commanding the subscriber terminals to enter the sleep mode, and transmitting a response message (i.e., an SLP-RSP message) serving as a response to the sleep request message to a corresponding subscriber terminal; and a group selector for receiving the sleep request message from the transmission/reception unit, determining a paging interval type of a corresponding subscriber terminal on the basis of sleep request information contained in the sleep request message and paging interval type information of the groups, selecting the same group as in the determined paging interval type, and registering the subscriber terminal corresponding to the selected group.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
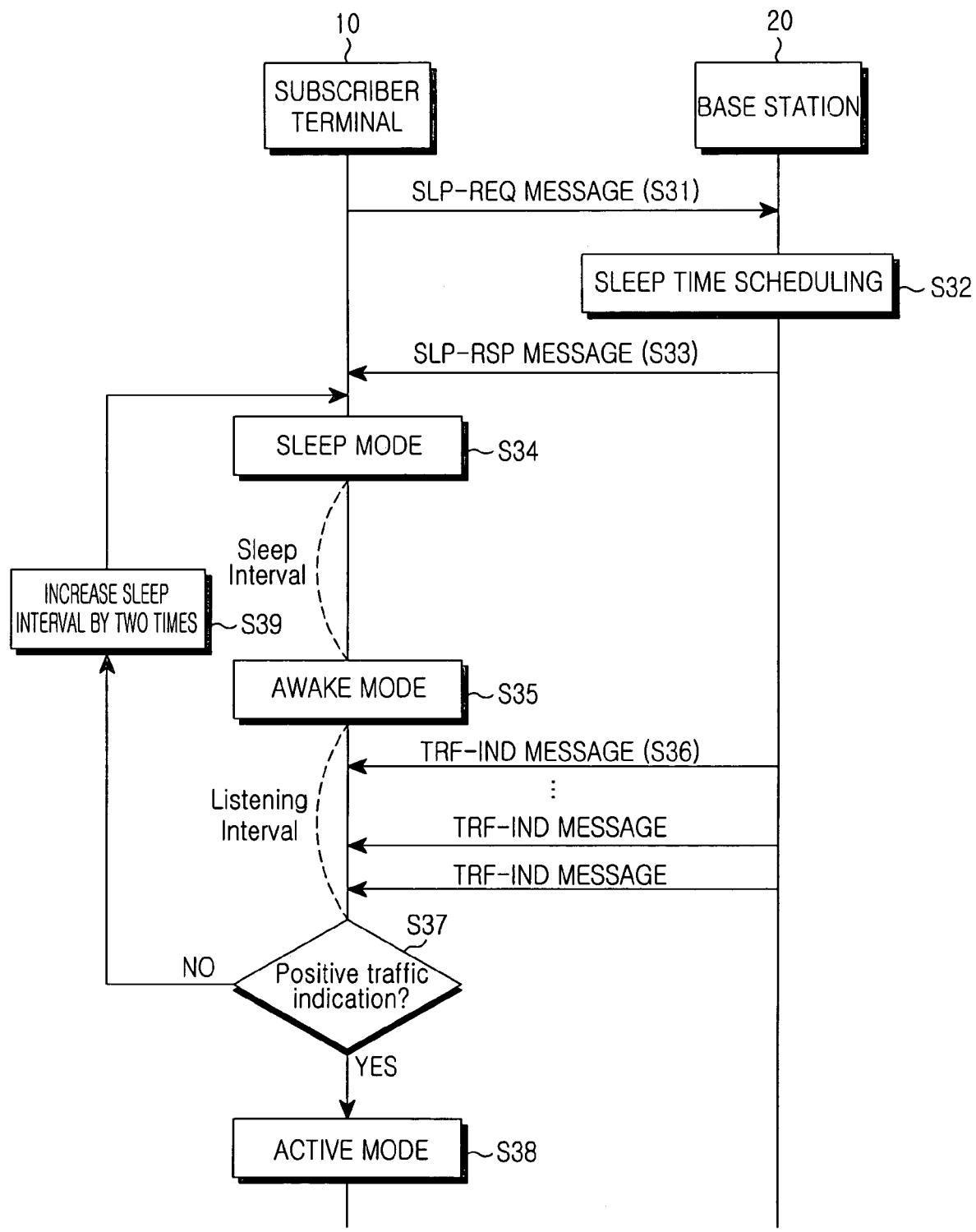
FIG. 1 is a flow chart illustrating a sleep mode control method for use in an IEEE 802.16e communication system.
Figure 2A:
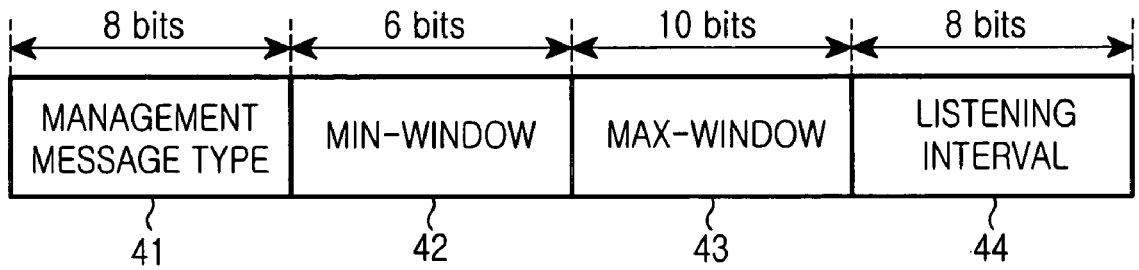
FIGS. 2a to 2d depict exemplary message formats communicating between a base station and a subscriber terminal to control a sleep mode in the IEEE 802.16e communication system.
Figure 2B:
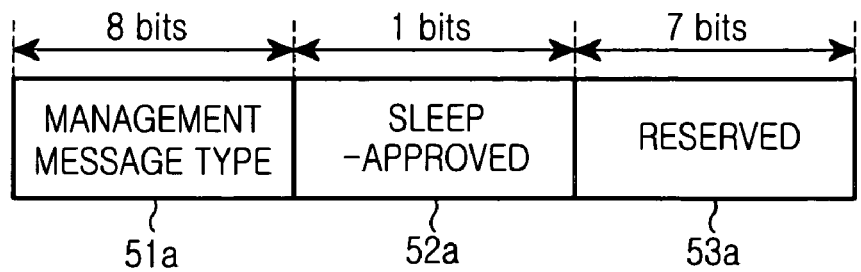
Figure 2C:
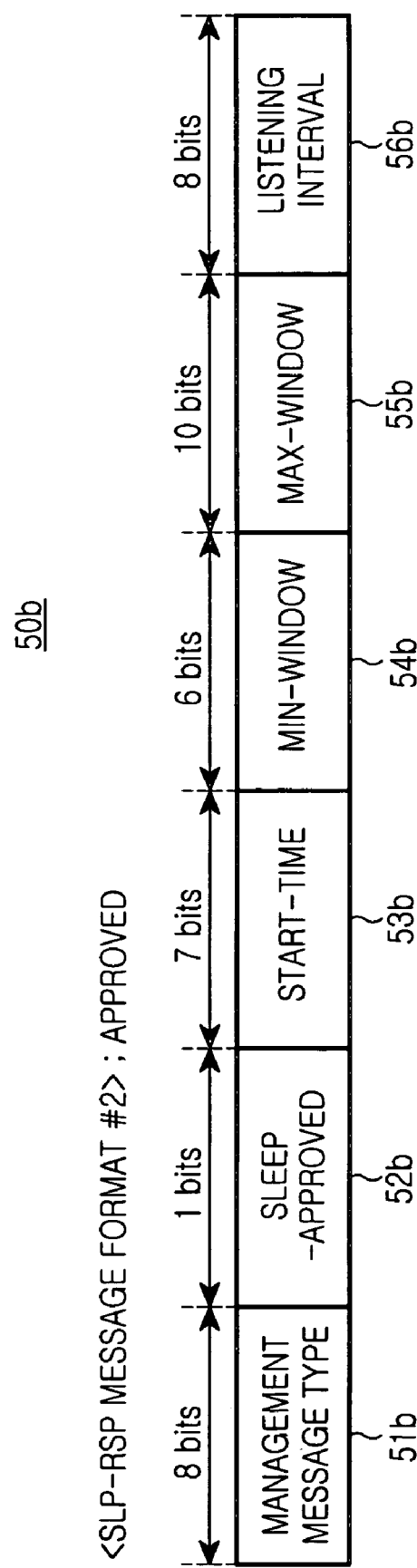
Figure 2D:
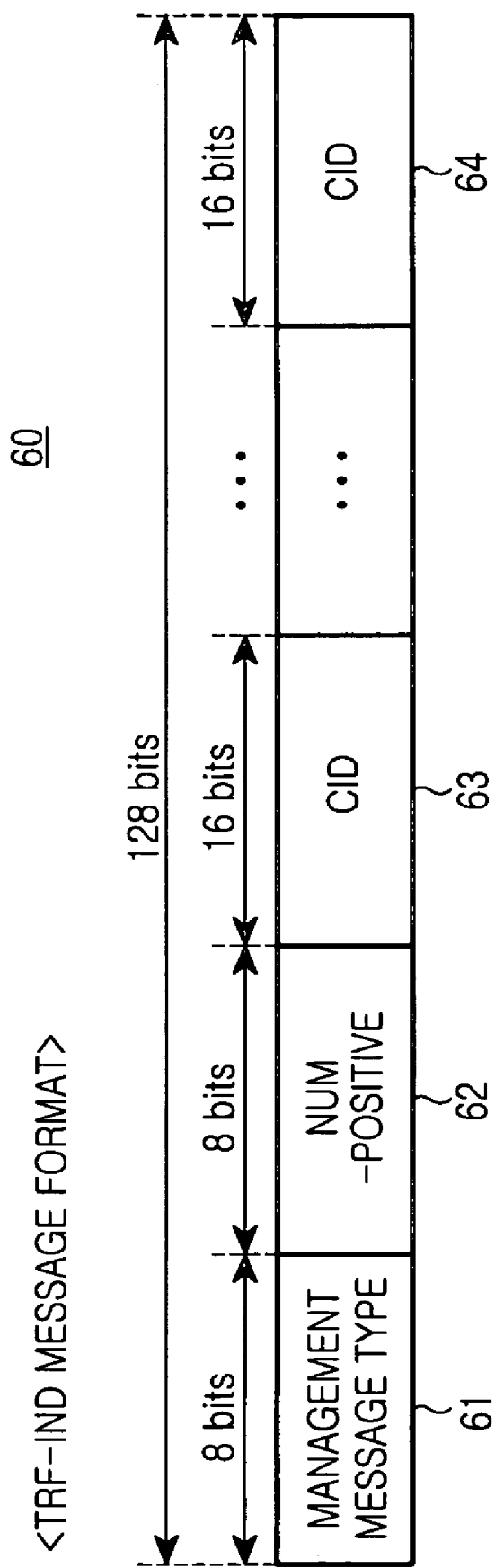
Figure 3:
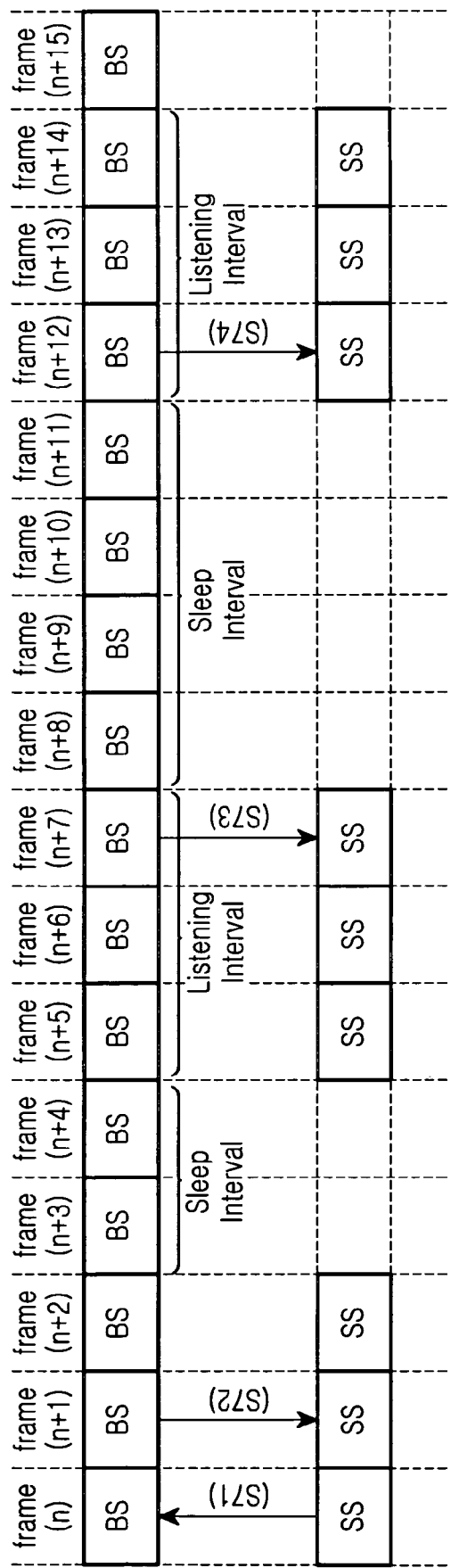
FIG. 3 is an exemplary configuration illustrating a sleep interval update algorithm for use in the IEEE 802.16e communication system.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention unclear.

Figure 4:
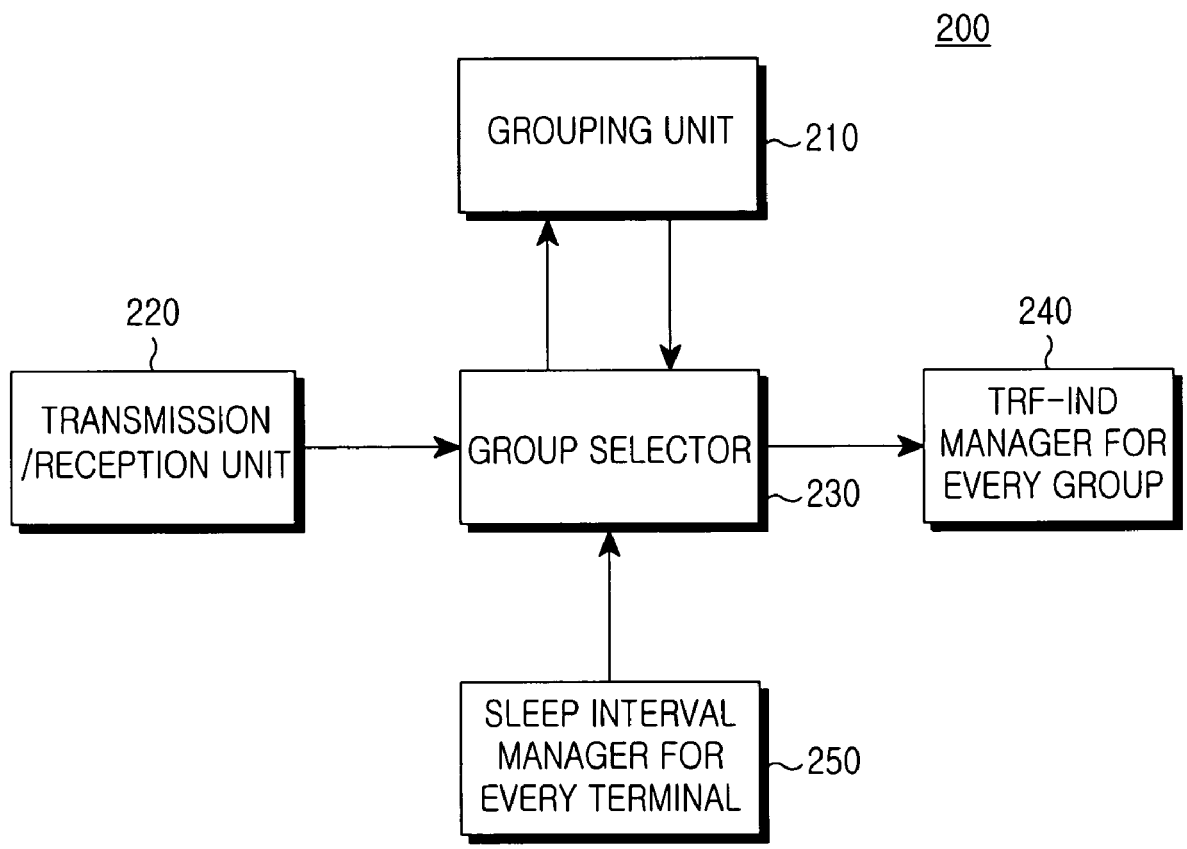
FIG. 4 is a block diagram illustrating a sleep mode control system in accordance with a preferred embodiment of the present invention.

FIG. 4 is a block diagram illustrating a sleep mode control system 200 in accordance with a preferred embodiment of the present invention. Referring to FIG. 4, the sleep mode control system according to the present invention includes a grouping unit 210, a transmission/reception unit 220, a group selector 230, a TRF-IND manager 240 for every group, and a sleep interval manager 250 for every terminal.

The grouping unit 210 sets up a predetermined number of groups that perform grouping on subscriber terminals according to category information of a paging interval composed of the sum of the sleep interval and the listening interval. Particularly, the grouping unit 210 determines and manages at least one exponentially-increased group and at least one max-window group. The exponentially-increased group repeats a prescribed operation during which a paging interval is increased according to an exponent power of 2 of an initial paging interval, i.e., by a multiple of 2 of a previous paging interval, within a predetermined range from a min-window field to a max-window field. The max-window group controls a paging interval to be repeated within a predetermined max-window field.

The transmission/reception unit 220 receives an SLP-REQ message for commanding individual subscriber terminals to enter the sleep mode, and transmits an SLP-RSP message serving as a response to the SLP-REQ message to the subscriber terminals. Particularly, the transmission/reception unit 220 receives the SLP-REQ message for setting a min-window size and a max-window size serving as sleep request information to the exponent power of 2 of the initial paging interval. Then, the transmission/reception unit 220 transmits the SLP-RSP message for setting the min-window size and the max-window size to the exponent power of 2 of the initial paging interval to a corresponding subscriber terminal. In this case, the SLP-REQ message and the SLP-RSP message include min-window indication information composed of 3 bits and max-window indication information composed of 4 bits.

If the transmission/reception unit 220 receives the SLP-REQ message from the subscriber terminal, the group selector 230 determines a paging interval type of a corresponding subscriber terminal on the basis of sleep request information (e.g., min-window, max-window, and listening interval information, etc.) contained in the SLP-REQ message and paging interval type data of groups prescribed in the grouping unit 210, and selects the same group as in the determined paging interval type such that the selected subscriber terminal is registered.

In this case, while the subscriber terminal increases its paging interval, the group selector 230 registers the subscriber terminal in the exponentially-increased group for increasing a paging interval at intervals of the same time interval as the paging interval of the subscriber terminal. If the paging interval of the subscriber terminal reaches the max-window field, the group selector 230 changes the subscriber terminal's paging interval to max-window group information equal to the max-window field of the subscriber terminal, and newly registers the max-window group information.

In the meantime, if paging interval type information of the subscriber terminal based on sleep request information is different from those of groups prescribed in the grouping unit 210, the group selector 230 registers the subscriber terminal in a group of a paging interval type similar to that of the subscriber terminal based on the sleep request information, sets a paging interval type of the group to a paging interval type of the subscriber terminal, and transmits the set paging interval type to a corresponding subscriber terminal.

The TRF-IND manager 240 for every group controls subscriber terminals contained in each group to awaken from the sleep mode upon receiving group selection information from the group selector 230, and checks a listening interval to determine the TRF-IND message reception. The TRF-IND manager 240 generates a TRF-IND message containing a BCID of the subscriber terminal contained in a corresponding group, and transmits the TRF-IND message to the listening interval for the group.

The paging interval manager 250 for every terminal updates and manages a paging interval for every terminal with the lapse of time, and transmits subscriber terminal information whose paging interval reaches a max-window field to the group selector 230 in such a way that it changes a group of the subscriber terminal to another group.

Figure 5A:
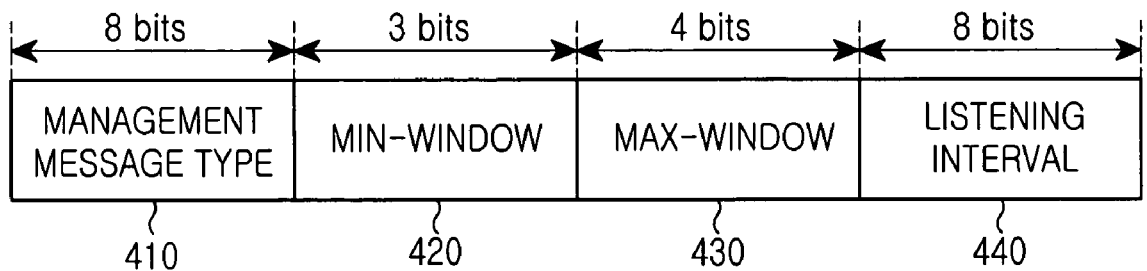
FIGS. 5a to 5c depict exemplary message formats communicating between a base station and a subscriber terminal to control a sleep mode.
Figure 5B:
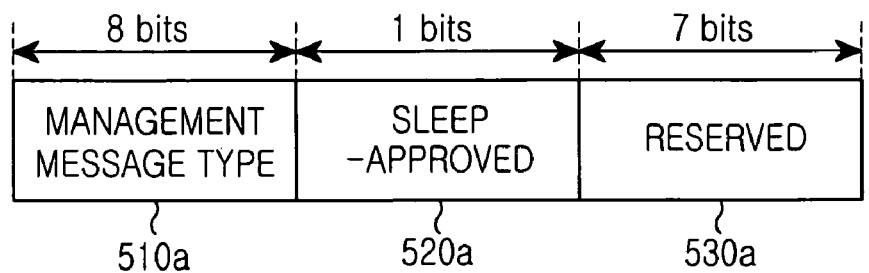
Figure 5C:
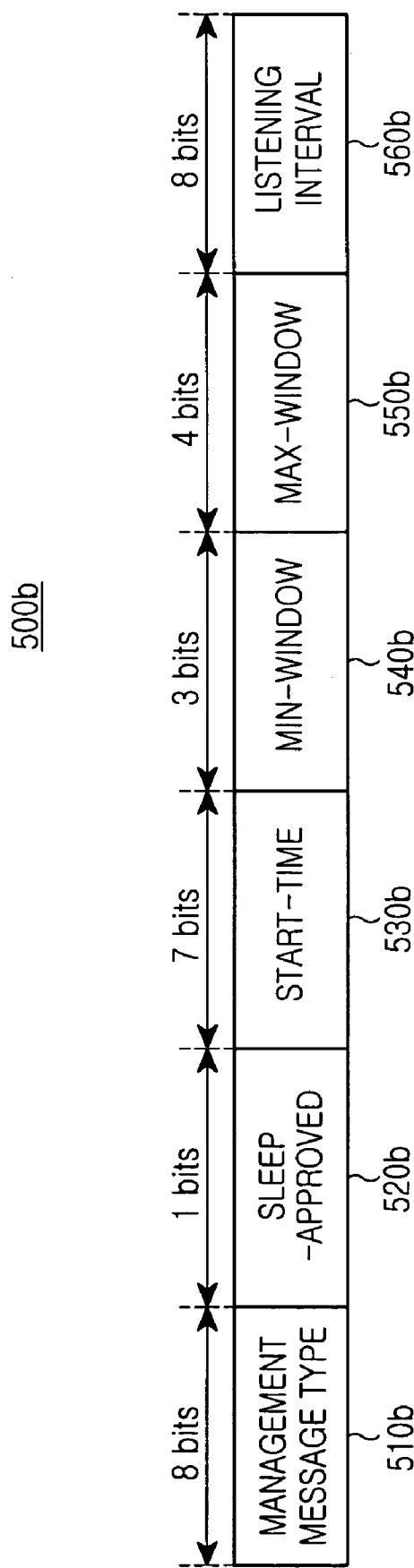

FIGS. 5a to 5c are examples of the SLP-REQ message and the SLP-RSP message. FIG. 5a is an exemplary message format illustrating the SLP-REQ message in accordance with a preferred embodiment of the present invention. FIGS. 5b and 5c are exemplary message formats of the SLP-RSP message in accordance with a preferred embodiment of the present invention.

Referring to FIG. 5a, the SLP-REQ message 400 includes a management message type field 410 composed of 8 bits, a min-window field 420 composed of 3 bits, a max-window field 430 composed of 4 bits, and a listening interval 440 composed of 8 bits. Individual elements shown in FIG. 5a are the same as those of the aforementioned conventional SLP-REQ message. However, the SLP-REQ message 400 shown in FIG. 5a does not represent each of the min-window and max-window fields in the form of a frame unit, but represents each of the min-window and max-window fields in the form of the exponent power of 2 of the initial paging interval, such that it reduces data capacity needed to setup the size of the min-window field 420 by 3 bits, and reduces other data capacity needed to setup the size of the max-window field 430 by 6 bits. In more detail, the SLP-REQ message 400 changes data capacity of 6 bits to 3 bits, and changes data capacity of 10 bits to 4 bits. In conclusion, the SLP-REQ message 400 of FIG. 5a reduces overall data capacity from 32 bits to 23 bits, resulting in a reduction in data capacity of 9 bits. Therefore, the present invention greatly reduces data capacity needed to setup individual min-window and max-window sizes, resulting in effective traffic use.

Referring to FIG. 5b, the SLP-RSP message 500a generated when the sleep request is denied includes a management message type field 510a composed of 8 bits, a sleep-approved field 520a composed of 1 bit, a reserved field 530a composed of 7 bits. In this way, the SLP-RSP message 500a generated when the sleep request is denied is similar to that of the aforementioned conventional case, because there is no min-window and max-window size information needed to update the sleep interval in the SLP-RSP message 500a.

Referring to FIG. 5c, the SLP-RLP message 500b generated when the sleep request is approved includes a management message type field 510b composed of 8 bits, a sleep-approved field 520b composed of 1 bit, a start-time field 530b composed of 7 bits, a min-window field 540b composed of 3 bits, a max-window field 550b composed of 4 bits, and a listening interval 560b composed of 8 bits. Individual elements shown in FIG. 5c are the same as those of the aforementioned conventional SLP-REQ message. However, the SLP-RLP message 500b shown in FIG. 5c does not represent each of the min-window and max-window fields in the form of a frame unit in a similar way as in the SLP-REQ message 400 of FIG. 5a, but represents each of the min-window and max-window fields in the form of the exponent power of 2 of the initial paging interval, such that it reduces data capacity needed to setup the size of min-window field 540b by 3 bits, and reduces other data capacity needed to setup the size of the max-window field 550b by 6 bits. In more detail, the SLP-RLP message 500b changes data capacity of 6 bits to 3 bits, and changes data capacity of 10 bits to 4 bits. In conclusion, the SLP-RLP message 500b of FIG. 5c reduces overall data capacity from 40 bits to 31 bits, resulting in a reduction in data capacity of 9 bits. Therefore, the present invention greatly reduces data capacity needed to setup individual min-window and max-window sizes, resulting in effective traffic use.

Figure 6:
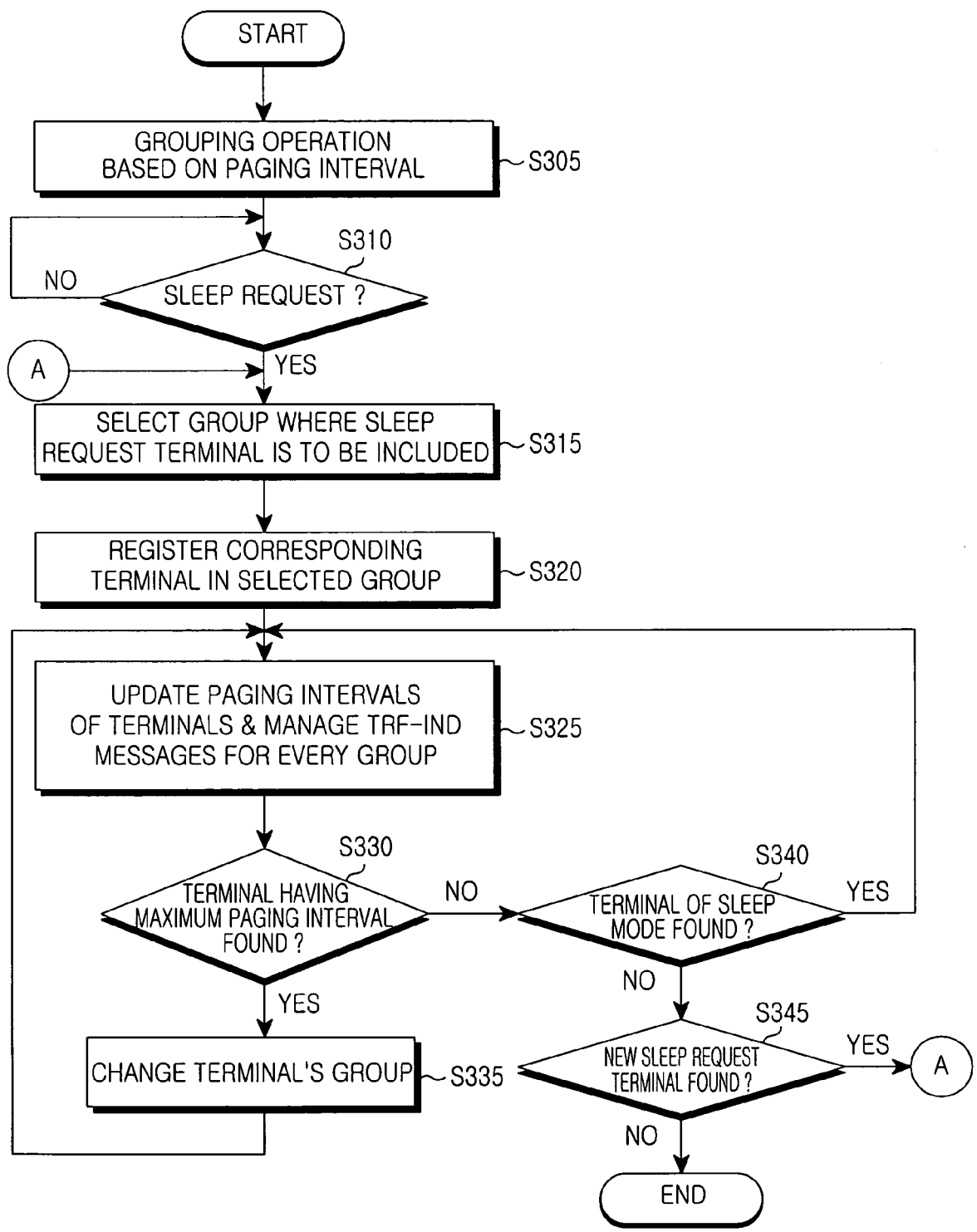
FIG. 6 is a flow chart illustrating a sleep mode control method in accordance with a preferred embodiment of the present invention.

FIG. 6 is a flow chart illustrating a sleep mode control method in accordance with a preferred embodiment of the present invention. Referring to FIG. 6, the sleep mode control method according to the present invention first performs grouping on subscriber terminals on the basis of a paging interval at step 305. A predetermined number of groups for grouping the subscriber terminals according to category information of a paging interval equal to the sum of the sleep interval and the listening interval are determined. In this case, the group determines at least one exponentially-increased group and at least one max-window group. The exponentially-increased group repeats a prescribed operation during which a paging interval is increased according to the exponent power of 2 of the initial paging interval within a predetermined range from the min-window field to the max-window field. The max-window group controls a paging interval to be repeated within a predetermined max-window field.

If the subscriber terminal transmits a sleep request at step S310, paging interval type information of the subscriber terminal is determined on the basis of the sleep request and paging interval type information of the groups, and a specific group in which the subscriber terminal is to be included is selected from among the groups at step S315. Then, the subscriber terminal is registered in the selected group at step S320. In this case, the subscriber terminal is registered in the exponentially-increased group for increasing the paging interval at intervals of the same time as the paging interval of the subscriber terminal. If a paging interval type of the subscriber terminal based on the sleep request information is different from those of groups determined at the above step S305, the subscriber terminal is registered in a group of a paging interval type similar to that of the subscriber terminal based on the sleep request information.

In this way, if the subscriber terminal is registered in the exponentially-increased group, paging intervals of the subscriber terminals are updated and the TRF-IND messages for every group are managed at step S325. If a subscriber terminal whose paging interval reaches a maximum value is found at step S330 while performing the step S325, a group of the subscriber terminals having the maximum paging interval is changed to another group at step S335. In more detail, the subscriber terminal's group is changed to a max-window group for repeating the same paging interval as the max-window field of the subscriber terminal.

Steps S325 to S335 are repeated while the subscriber terminal is in the sleep mode. If there is no subscriber terminal in the sleep mode at step S340, steps S325 to S335 are not repeated. If it is determined that a subscriber terminal newly requesting the sleep mode is found at step S345, steps from the above step S315 are executed. Otherwise, if it is determined that there is no subscriber terminal newly requesting the sleep mode at step S345, the process is terminated.

Figure 7:
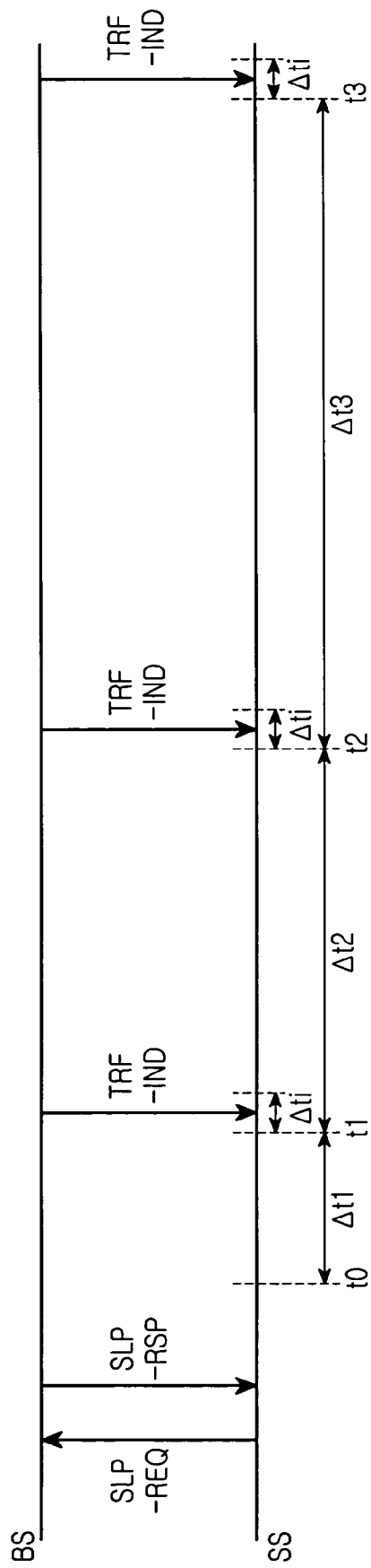
FIG. 7 is a conceptual diagram of a paging interval in accordance with a preferred embodiment of the present invention.

FIG. 7 is a conceptual diagram of a paging interval in accordance with a preferred embodiment of the present invention. Referring to FIG. 7, if the base station BS transmits the SLP-RSP message serving as a response to the SLP-REQ message, the subscriber terminal SS enters the sleep mode at a sleep mode start time $t_o$ prescribed in the sleep request process, is in the sleep mode during a min-window interval $\Delta t_i$ determined by the sleep request process, and receives the TRF-IND message during the listening interval $\Delta t_i$. In this case, the min-window interval $\Delta t_1$ is an initial paging interval.

The subscriber terminal SS again receives the TRF-IND message after the lapse of a predetermined paging interval $\Delta t_2$ including the listening interval $\Delta t_i$. In this case, the paging interval is counted from the sleep mode start time $t_o$. All the paging intervals ($\Delta t_2$, $\Delta t_3$, . . . ) other than the initial paging interval $\Delta t_1$ include the same listening interval $\Delta t_i$, and are increased according to the exponent power of 2 of the initial paging interval. For example, the paging interval $\Delta t_2$ is $2^1$ of the paging interval $\Delta t_1$, and the paging interval $\Delta t_3$ is $2^2$ of the paging interval $\Delta t_1$ or $2^1$ of the paging interval $\Delta t_2$. In this case, $2^2$ of the paging interval $\Delta t_1$ is equal to $2^1$ of the paging interval $\Delta t_2$.

Figure 8:
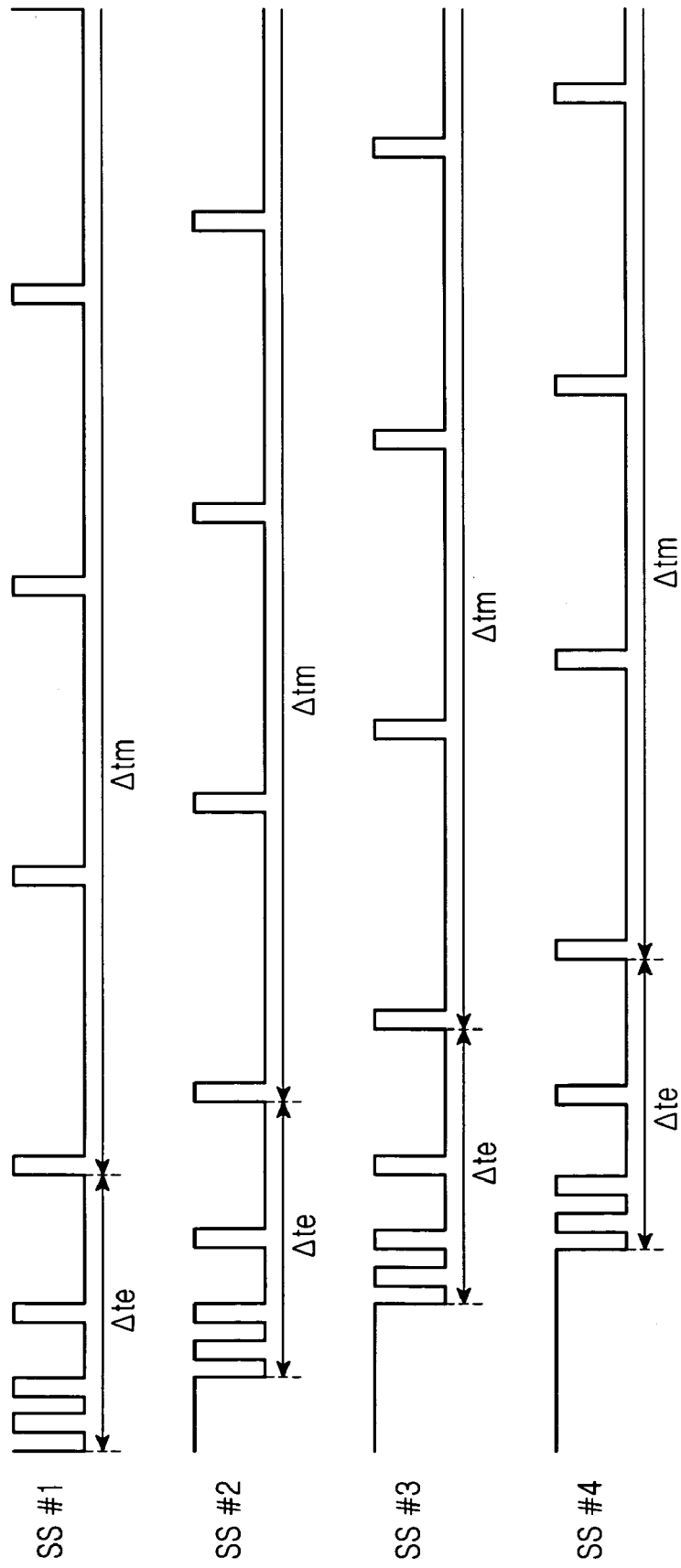
FIG. 8 is a timing diagram illustrating a grouping operation of subscriber terminals at a sleep mode start time in accordance with a preferred embodiment of the present invention.

FIG. 8 is a timing diagram illustrating an exemplary grouping operation of subscriber terminals at a sleep mode start time in accordance with a preferred embodiment of the present invention. Referring to FIG. 8, although individual subscriber terminals SS#1~SS#4 have the same paging interval type, their start time points are different from each other. Therefore, if individual sleep start time points of the subscriber terminals SS#1, SS#2, and SS#3 are set to a predetermined start time point of the subscriber terminal SS#4, the base station BS can transmit the TRF-IND message at one time, resulting in effective use. However, terminals requesting entry into the sleep mode after the subscriber terminal SS#4 has transmitted the sleep request message cannot enter the group. In more detail, provided that a plurality of terminals having similar start times are combined and managed in one group, a new group must be continuously created with the lapse of time, and a previous group must also be maintained until all the terminals contained in the previous group enter the active mode. Therefore, in this case, there arises an unexpected problem that the number of the group is less than the number of the terminal executing the sleep operation, but is still numerous.

Figure 9:
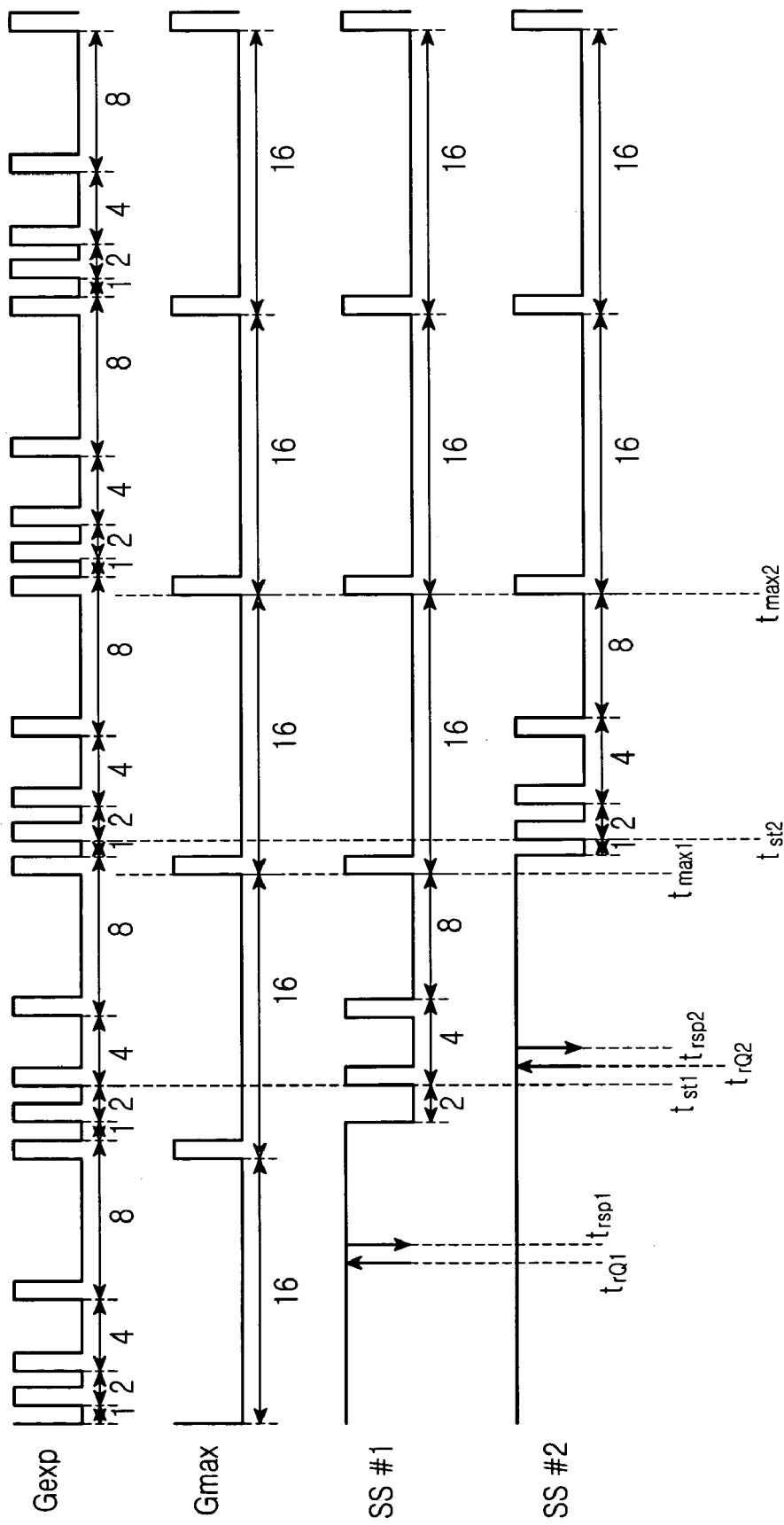
FIG. 9 is a timing diagram illustrating group registration and group movement operations of subscriber terminals in accordance with a preferred embodiment of the present invention.

FIG. 9 is a timing diagram illustrating group registration and group movement operations of subscriber terminals in accordance with a preferred embodiment of the present invention. In the case where the exponentially-increased group for repeating a prescribed operation during which a paging interval is increased according to the exponent power of 2 of the initial paging interval within a predetermined range from the min-window field to the max-window field, and the max-window group for controlling the paging interval to be repeated within a predetermined max-window field are determined and managed, group registration and group movement operations of subscriber terminals are executed as shown in FIG. 9.

Referring to FIG. 9, $G_{exp}$ indicates a paging interval type of the exponentially-increased group, the number of which is gradually increased in the order of '2'→'4'→'8', and $G_{max}$ indicates a paging interval type of the max-window group for fixing its own paging interval to '16'.

In this case, if the subscriber terminal SS#1 transmits a sleep request message at a time $t_{rq1}$, and receives a response to the sleep request message at a time $t_{rsp1}$, the subscriber terminal SS#1 is registered in $G_{exp}$ during a predetermined time from $t_{st1}$ to $t_{max1}$, performs a sleep operation during the predetermined time, changes its current group to another group $G_{max}$ at the time $t_{max1}$, and performs the sleep operation. In case of the subscriber terminal SS#1, the requested min-window is 4.

In the case of the subscriber terminal SS#2, if the subscriber terminal SS#2 transmits a sleep request at a time $t_{rq2}$, and receives a response to the sleep request at a time $t_{rsp2}$, the subscriber terminal SS#2 is registered in $G_{exp}$ during a predetermined time from $t_{st2}$ to $t_{max2}$, and performs a sleep operation during the predetermined time, changes its current group to another group $G_{max}$ at the time $t_{max2}$, and then performs the sleep operation. In case of the subscriber terminal SS#2, the requested min-window is 2.

Figure 10:
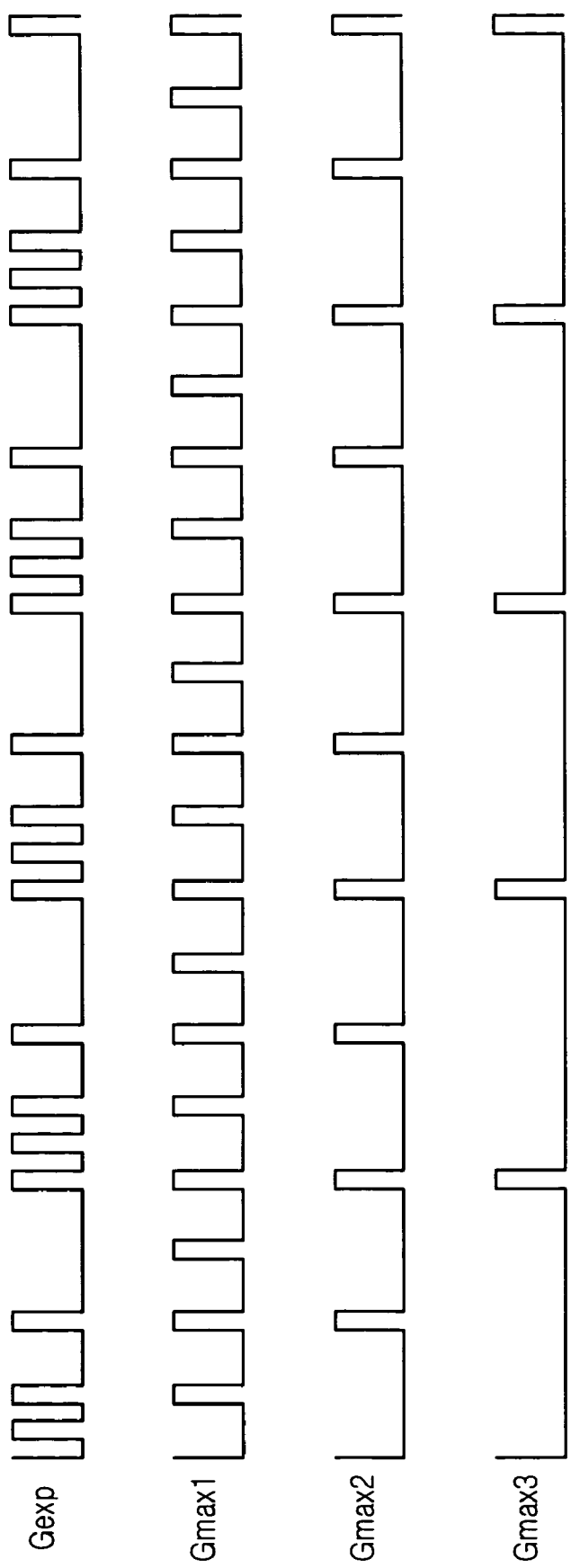
FIGS. 10 and 11 are timing diagrams illustrating exemplary operations of a paging interval group for grouping subscriber terminals in accordance with a preferred embodiment of the present invention.
Figure 11:
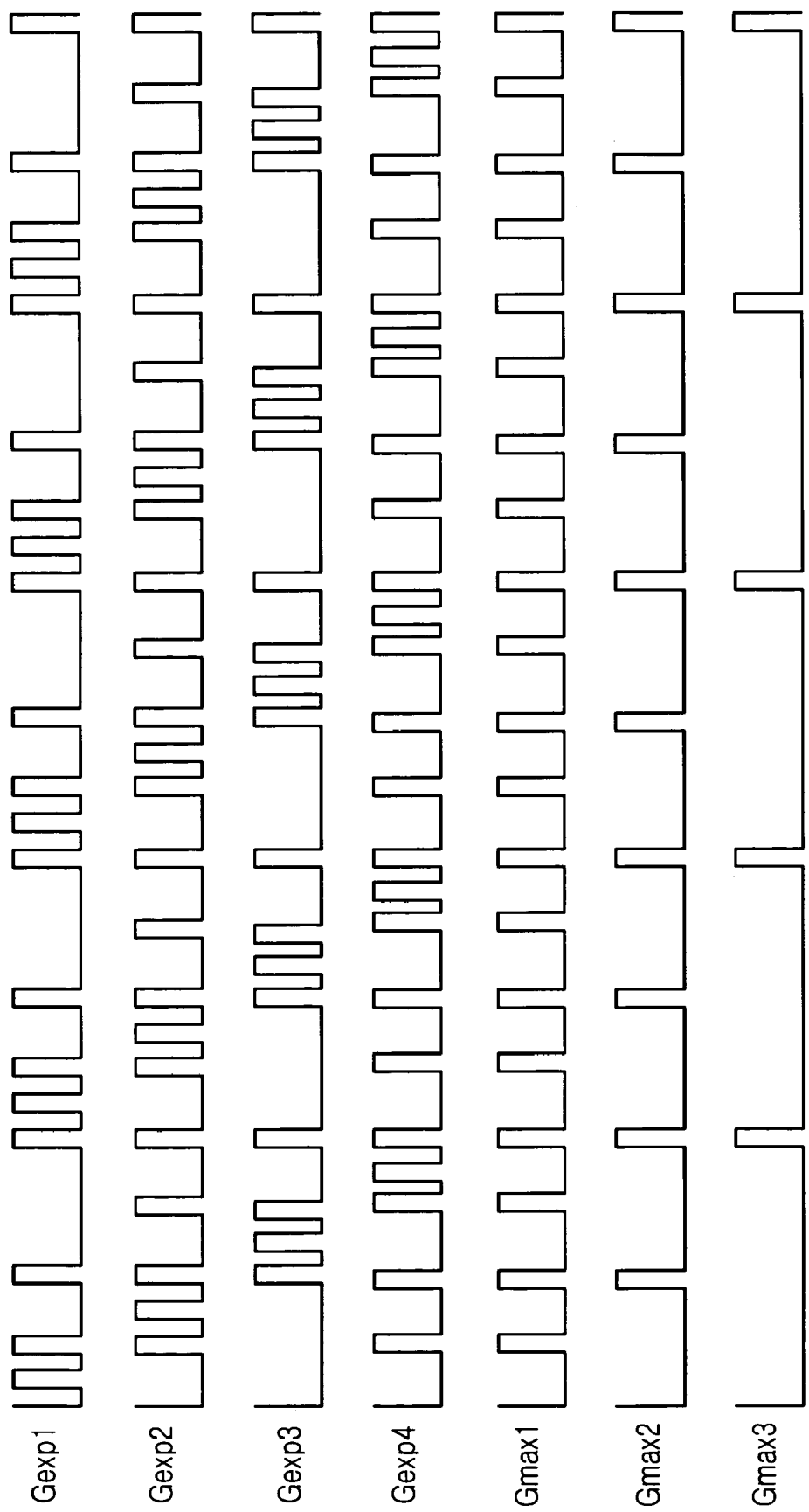

FIGS. 10 and 11 are timing diagrams illustrating exemplary operations of a paging interval group for grouping subscriber terminals in accordance with a preferred embodiment of the present invention. FIG. 10 is a timing diagram illustrating an exemplary process for operating one exponentially-increased group $G_{exp}$ and three max-window groups $G_{max1}$, $G_{max2}$, and $G_{max3}$. FIG. 11 is a timing diagram illustrating an exemplary process for operating four exponentially-increased groups $G_{exp1}$, $G_{exp2}$, $G_{exp3}$, and $G_{exp4}$, and three max-window groups $G_{max1}$, $G_{max2}$, and $G_{max3}$.

As apparent from the above description, the present invention sets each of min-window and max-window sizes indicative of sleep interval scheduling information to the exponent power of 2 of the initial paging interval in a wireless access communication system, such that it can reduce data capacity for indicating the min-window size and the max-window size. Furthermore, the present invention controls a base station for use in the wireless access communication system to group and manage subscriber terminals, such that it reduces an amount of data traffic needed to transmit a paging message, and enhances sleep mode control efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a sleep mode containing a sleep interval and a listening interval in a wireless access communication system containing a base station and subscriber terminals, comprising the steps of:
   a) determining a predetermined number of groups for grouping the subscriber terminals according to type information of a paging interval equal to the sum of the sleep interval and the listening interval; and
   b) upon receiving a sleep request message from any one of the subscriber terminals, determining a paging interval type of the subscriber terminal on the basis of the sleep request message and paging interval types of the groups, and registering the subscriber terminal in one group from among the groups.

2. The method as set forth in claim 1, wherein step (a) includes the step of:
   a1) determining at least one exponentially-increased group for repeating a prescribed operation during which the paging interval is increased according to an exponent power of 2 of an initial paging interval within a predetermined range from a mm-window (minimum window) field to a max-window (maximum window) field, and at least one max-window group for controlling the paging interval to be repeated within a predetermined max-window field.

3. The method as set forth in claim 2, wherein step (b) includes the steps of:
   b1) registering the subscriber terminal in the exponentially-increased group for increasing its own paging interval at intervals of the same time as a paging interval of the subscriber terminal for a predetermined period of time during which the paging interval of the subscriber terminal is increased; and
   b2) if the paging interval of the subscriber terminal reaches the max-window field, changing a current group of the subscriber terminal to a max-window group equal to the max-window field of the subscriber terminal, and newly registering the changed max-window group.

4. The method as set forth in claim 1, wherein step (b) further includes the step of:
   b3) receiving the sleep request message for setting mm-window and mn-window sizes indicative of sleep request information to an exponent power of 2 of an initial paging interval from the subscriber terminal.

5. The method as set forth in claim 1, wherein step (b) further includes the step of:
   b4) if the paging interval type information of the subscriber terminal based on the sleep request message is different from those of groups determined by step (a), registering the subscriber terminal in a group of a paging interval type similar to that of the subscriber terminal based on the sleep request message, selling a paging interval type of the group to a paging interval type of the subscriber terminal, and transmitting the set paging interval type to a corresponding subscriber terminal.

6. An apparatus for controlling a sleep mode containing a sleep interval and a listening interval in a wireless access communication system, comprising:
   a grouping unit for determining a predetermined number of groups for grouping subscriber terminals according to type information of a paging interval equal to the sum of the sleep interval and the listening interval;
   a transmission/reception unit for receiving a sleep request message (SLP-REQ message) for commanding the subscriber terminals to enter the sleep mode, and transmitting a response message (SLP-RSP message) serving as a response to the sleep request message to a corresponding subscriber terminal; and
   a group selector for receiving the sleep request message from the transmission/reception unit, determining a paging interval type of a corresponding subscriber terminal on the basis of sleep request information contained in the sleep request message and paging interval type information of the groups, selecting the same group as in the determined paging interval type, and registering the subscriber terminal corresponding to the selected group.

7. The apparatus as set forth in claim 6, wherein the grouping unit determines at least one exponentially-increased group for repeating a prescribed operation during which the paging interval is increased according to an exponent power of 2 of an initial paging interval within a predetermined range from a mm-window (minimum window) field to a max-window (maximum window) field, and at least one max-window group for controlling the paging interval to be repeated within a predetermined max-window field, and manages the determined groups.

8. The apparatus as set forth in claim 6, wherein the transmission/reception unit receives the sleep request message for setting mm-window and max-window sizes indicative of sleep request information to an exponent power of 2 of an initial paging interval from the subscriber terminal.

9. The apparatus as set forth in claim 8, wherein the sleep request message includes mm-window indication information composed of 3 bits, and max-window indication information composed of 4 bits.

10. The apparatus as set forth in claim 6, wherein the transmission/reception unit transmits a response message for setting each of min-window and max-window sizes indicative of sleep request information to an exponent power of 2 of an initial paging interval to a corresponding subscriber terminal.

11. The apparatus as set forth in claim 9, wherein the response message includes mm-window indication information composed of 3 bits, and max-window indication information composed of 4 bits.

12. The apparatus as set forth in claim 6, wherein the group selector registers the subscriber terminal in the exponentially-increased group for increasing its own paging interval at intervals of the same time as a paging interval of the subscriber terminal for a predetermined period of time during which the paging interval of the subscriber terminal is increased, changes a current group of the subscriber terminal to a max-window group equal to the max-window field of the subscriber terminal if the paging interval of the subscriber terminal reaches the max-window field, and registers the changed max-window group.

13. The apparatus as set forth in claim 6, wherein the group selector, if the paging interval type information of the subscriber terminal based on the sleep request is different from those of groups, registers the subscriber terminal in a group of a paging interval type similar to that of the subscriber terminal based on the sleep request information, sets a paging interval type of the group to a paging interval type of the subscriber terminal, and transmits the set paging interval type to a corresponding subscriber terminal.

14. A method for controlling a sleep mode in a wireless access communication system containing a base station and subscriber terminals, comprising the step of:

increasing a paging interval containing the sum of a variable sleep interval and a predetermined size of listening interval according to an exponent power of 2 of a mm-window from a mm-window field to a max-window field.

15. A method for controlling a sleep mode in a wireless access communication system containing a base station and subscriber terminals, comprising the step of:

counting a paging interval containing the sum of a listening interval and a sleep interval at every entry into the sleep mode, and at the same time changing the sleep interval; and increasing the sleeo interval by K times of either a predetermined min-window or a previous paging interval until the paging interval is same as a predetermined max-window, wherein K is 2.

16. A method as set forth in claim 15, wherein the listening interval is fixed.

* * * * *